United States Patent Office

2,928,819
Patented Mar. 15, 1960

2,928,819

PROCESS FOR THE CHLORINATION OF POLYETHYLENE

Heinz Noeske, Oberhausen-Sterkrade, Germany, assignor to Ruhrchemie Aktiengesellschaft, Oberhausen-Holten, Germany No Drawing. Application July 30, 1957
Serial No. 675,027

Claims priority, application Germany August 8, 1956

2 Claims. (Cl. 260—94.9)

According to a known process, polyethylene is chlorinated by allowing gaseous chlorine, which, if desired, has been diluted with inert gases, to act upon solid powder in as finely divided form as possible, using temperatures not substantially in excess of 100° C. It is of particular advantage if the powder being chlorinated is maintained in form of a fluidized bed during the chlorination.

By this known process, chlorinated polyethylenes can be easily prepared if the content of chlorine in the finished products is not to exceed about 40% by weight. It is very difficult, however, to prepare products with a higher content of chlorine by this process, since extremely long chlorination periods are required in this case. Although the chlorination time may be reduced, to some extent, by increasing the temperature, this entails the risk that charring of the reaction product is caused by the evolution of excessive heat resulting in black colored and sintered products.

It has now been found that the chlorination of polyethylene at temperatures up to about 110° C. and by the action of gaseous chlorine diluted, if desired, with inert gases on the solid and finely divided powder, can be effected with very favorable results, when the polyethylene, before the chlorination, is admixed with pulverulent substances which are inert to chlorine and can be easily removed from the mixture after the termination of the chlorination. Particularly suitable for the process of the invention is a polyethylene which has been produced by the polymerization of ethylene at pressures below about 100 kg./sq. cm. and temperatures of as high as about 100° C. with the use of catalysts consisting of mixtures of organometallic compounds, especially aluminum alkyl compounds, with metal compounds of the 4th to 6th subgroups of the periodic system, particularly with titanium compounds, e.g. titanium tetrachloride. The particle size of the added substances is preferably below 300 microns. The bulk weight of these substances should be as low as possible.

The removal of the added substances may be effected by means of water, acids, or alkaline solutions. Suitable substances primarily include magnesia, anhydrous magnesium sulfate, anhydrous aluminum sulfate, anhydrous sodium sulfate, and sodium chloride.

The quantity of the added substance may be increased to an extent that the mixture charged to the chlorination has a content of added substances of as high as about 80% by weight. However, mixtures in a ratio by weight of 1:1 are generally used.

The particular advantage of the working method according to the invention consists in that substantially shorter reaction periods are possible with the reaction temperature being the same. However, it is also possible to increase the reaction temperature as compared to that used in the chlorination without substances of addition, with no charring being encountered. At the same time, a substantial reduction in chlorination time is also possible in this case.

The invention will now be described more fully in the following examples, but it should be understood that these are given by way of illustration and not of limitation and that many changes in the details can be made without departing from the spirit of the invention.

Example 1

50 grams of a polyethylene having an average molecular weight of about 200,000 as determined biscosimetrically were filled into a glass tube of 45 mm. in diameter and 500 mm. in length, in which a G 3 frit (fabricated by Schott & Gen.) had been attached by fusion and which was maintained at a temperature of 75° C. by circulating water. 76% of this polyethylene had a particle size of below 100 microns. A mixture of 70 liters/hr. of nitrogen and 70 liters/hr. of chlorine was passed through the glass frit. After a reaction period of 4 hours, a content of 34% of chlorine was found in the polyethylene. By continuing the chlorination for additional 4 hours at 80° C., a product having a chlorine content of 41% could be obtained.

If, in accordance with the process of the invention, a mixture of 30 grams of the same polyethylene and 30 grams of pulverulent magnesia, 78% of which had a particle size of below 100 microns, was filled in and a mixture of 70 liters/hr. of chlorine and 70 liters/hr. of nitrogen was passed through the apparatus, the polyethylene had a chlorine content of 46% after 4 hours of reaction. Continuing the chlorination at 80° C. resulted in a product with a chlorine content of 52%. Prior to the determination of chlorine, the products had been treated with 10% nitric acid at room temperature.

Example 2

50 grams of a polyethylene having an average molecular weight of about 200,000, and the particle size of 76% of which was below 100 microns, was filled into the apparatus described in Example 1, together with 50 grams of ground sodium chloride. At a temperature of 70° C., a mixture of 80 liters/hr. of chlorine and 80 liters/hr. of nitrogen was introduced. After 4 hours, a chlorine content of 43% was found in the product. Continuing the chlorination for 4 hours at 75° C. resulted in a product with a chlorine content of 53%.

Example 3

A mixture of 30 grams of polyethylene having an average molecular weight of about 200,000 and 110 grams of anhydrous sodium sulfate was filled into the apparatus described in Example 1. Into this mixture, about 70 liters/hr. of chlorine and 70 liters/hr. of nitrogen were simultaneously introduced at 80° C. After 4 hours of reaction, the product had a content of chlorine of 35%. Continuing the chlorination for 4 hours at 90° C. resulted in a product with a chlorine content of 55%.

Example 4

A mixture of 15 grams of a polyethylene having an average molecular weight of about 200,000 and 50 grams of anhydrous magnesium sulfate was filled into the apparatus described in Example 1 and a mixture of 80 liters/hr. of chlorine and 80 liters/hr. of nitrogen was allowed to act upon the mixture at a temperature of 85° C. After 4 hours of reaction, the polyethylene had a content of chlorine of 48% which could be increased to 58% by continuing the chlorination for four hours.

Example 5

A mixture of 50 grams of polyethylene having an average molecular weight of about 200,000 and 50 grams of anhydrous aluminum sulfate was filled into the apparatus described in Example 1. The mixture was treated with 80 liters/hr. of chlorine and 80 liters/hr. of nitrogen at 85° C. After 4 hours of reaction a chlorine content of 52% was found. Continuing the chlorination for 4 hours at 90° C. resulted in a product with 57% of chlorine.

Example 6

A mixture of 20 grams of polyethylene having an average molecular weight of about 200,000 and 40 grams of magnesia was filled into the apparatus described in Example 1, the temperature of which was controlled by means of circulating oil instead of circulating water. A mixture of 70 liters/hr. of chlorine and 70 liters/hr. of nitrogen was passed through the product at a temperature of 100° C. After 4 hours of reaction a content of chlorine of 58% was found. Continuing the chlorination for 4 hours at 105° C. resulted in a product having a chlorine content of 69%.

Example 7

800 grams of a polyethylene having an average molecular weight of about 100,000 was filled into a glass tube of 120 mm. in diameter and 800 mm. in length and sealed at the bottom by a plate of stoneware. By means of 3 infrared lamps of 250 watts each, the reaction zone was brought to a temperature of 50° C. and maintained at this temperature by means of a temperature controller which in turn was controlled by a thermocouple. A stream of 150 liters/hr. of chlorine and 750 liters/hr. of nitrogen was introduced through the frit thereby producing a fluidized bed. The concentration of chlorine was hourly increased by 50 liters and the concentration of nitrogen was reduced to the same extent until the mixture was composed of 750 liters/hr. of chlorine and 150 liters/hr. of nitrogen. The following contents of chlorine were found in this experiment:

After 4 hours 18% of chlorine
After 8 hours 27% of chlorine
After 12 hours 33% of chlorine
After 16 hours 36% of chlorine When the reaction temperature in this experiment was increased to 60° C., the product instantly acquired a black color.

In accordance with the invention, 750 grams of polyethylene having an average molecular weight of about 100,000 were now filled into the same apparatus together with 50 grams of magnesia and chlorinated under the same conditions as mentioned above. Only the temperature was increased to 65° C. in this experiment without a charring reaction taking place. The contents of chlorine found during the experiment in the product are listed below:

After 4 hours 30% of chlorine
After 8 hours 38% of chlorine
After 12 hours 46% of chlorine
After 16 hours 52% of chlorine

Example 8

A mixture of 400 grams of polyethylene having an average molecular weight of about 300,000 and 400 grams of magnesia was filled into the apparatus having the same dimensions as that described in Example 7 but being heated by a heating jacket with water circulation. By means of circulating water, the temperature in the reaction space was adjusted to 80° C. and maintained at this level for 12 hours. Thereafter, the temperature was increased to 85° C. The flow of chlorine and the concentration of chlorine were adjusted as mentioned in Example 7. The following chlorine contents were found:

After 4 hours 14% of chlorine
After 8 hours 32% of chlorine
After 12 hours 43% of chlorine
After 16 hours 53% of chlorine
After 20 hours 61% of chlorine

What I claim is:

1. A process for the chlorination of solid powdered polyethylene at temperatures between 50 and approximately 110° C. by action of gaseous chlorine which comprises adding to said polyethylene, prior to chlorination, pulverulent substances, having a particle size of less than 300 microns, in proportions of polyethylene to said substances of approximately 1:1 to approximately 1:4, said pulverulent substances being inert to chlorine and selected from the group consisting of magnesia, anhydrous magnesium sulfate, anhydrous aluminum sulfate, anhydrous sodium sulfate and sodium chloride, and removing said substances after chlorination.

2. A process for the chlorination of solid powdered polyethylene obtained by the polymerization of ethylene at pressures below 100 kg./cm.$^2$ and at temperatures up to approximately 100° C. in the presence of catalysts consisting of mixtures of aluminum alkyl compounds with titanium compounds, which comprises adding to said polyethylene, prior to chlorination, pulverulent substances, having a particle size of less than 300 microns, in proportions of polyethylene to said substances of approximately 1:1 to approximately 1:4, said pulverulent substances being inert to chlorine and selected from the group consisting of magnesia, anhydrous magnesium sulfate, anhydrous aluminum sulfate, anhydrous sodium sulfate and sodium chloride, and removing said substances after chlorination.

References Cited in the file of this patent

UNITED STATES PATENTS

| | | |
|---|---|---|
| 2,398,803 | Myles | Apr. 23, 1946 |
| 2,503,252 | Ernsberger | Apr. 11, 1950 |
| 2,592,763 | Taylor | Apr. 15, 1952 |
| 2,748,105 | Becker et al. | May 29, 1958 |